(12) United States Patent
Majoe

(10) Patent No.: US 11,496,030 B2
(45) Date of Patent: Nov. 8, 2022

(54) ELECTROMAGNETIC MACHINE COMPRISING STATIONARY FORMER WITH SEGMENTED WINDING STRUCTURE

(71) Applicant: Dennis Majoe, Eastleigh (GB)

(72) Inventor: Dennis Majoe, Eastleigh (GB)

( * ) Notice: Subject to any disclaimer, the term of this patent is extended or adjusted under 35 U.S.C. 154(b) by 140 days.

(21) Appl. No.: 16/977,337

(22) PCT Filed: Mar. 1, 2019

(86) PCT No.: PCT/GB2019/050591
§ 371 (c)(1),
(2) Date: Sep. 1, 2020

(87) PCT Pub. No.: WO2019/166833
PCT Pub. Date: Sep. 6, 2019

(65) Prior Publication Data
US 2020/0412216 A1    Dec. 31, 2020

(30) Foreign Application Priority Data

Mar. 1, 2018 (GB) ...................... 1803360

(51) Int. Cl.
*H02K 21/14* (2006.01)
*H02K 11/21* (2016.01)
(Continued)

(52) U.S. Cl.
CPC ............ *H02K 21/14* (2013.01); *H02K 1/278* (2013.01); *H02K 3/47* (2013.01); *H02K 11/21* (2016.01)

(58) Field of Classification Search
CPC ........ H02K 21/14; H02K 21/18; H02K 11/21; H02K 3/47; H02K 3/524; H02K 1/278; H02K 1/274; H02K 1/2746; H02K 1/2753
(Continued)

(56) References Cited

U.S. PATENT DOCUMENTS 6,313,552 B1    11/2001   Boast
2014/0368095 A1  12/2014   Kamibayashi
(Continued)

FOREIGN PATENT DOCUMENTS

| DE | 10306500 A1 | 8/2004 | |
|---|---|---|---|
| GB | 2079068 A | 1/1982 | |
| GB | 2541360 A * | 2/2017 | ............. H02K 1/141 |

OTHER PUBLICATIONS

Igor Stamenkovic et al, "A novel modular permanent-magnet electric machine design", IECON 2009—35th Annual Conference of IEEE Industrial Electronics (IECON 2009)—Nov. 3-5, 2009—Porto, Portugal, IEEE, Piscataway, NJ, USA, Nov. 3, 2009 (Nov. 3, 2009).

(Continued)

*Primary Examiner* — Michael Andrews
(74) *Attorney, Agent, or Firm* — Bay State IP, LLC

(57) ABSTRACT

A motor (1) has a pair of journal supports (2), between which is journalled a rotor (3) on a shaft (4). The rotor has a disc (5) fast with the shaft and at right angles to it, whereby it rotates without wobble. At the circumference of the disc, a plurality of short, circular cylindrical permanent magnets (6) are provided at the same radial distance (7) from the shaft to their polar axes, tangential to the disc at their mid-point, with their polar axes in the central plane of the disc and the midpoints of the axes on a circular path (9) of radius (7), and equally spaced around the disc with an angular pitch (10) equal to double their polar length (11). A stator (12) carried by the supports on rods (14). It included two formers (15,16).

23 Claims, 14 Drawing Sheets

(51) Int. Cl.
*H02K 1/278* (2022.01)
*H02K 3/47* (2006.01)

(58) Field of Classification Search
USPC .................................... 310/68 B, 216.023
See application file for complete search history.

(56) References Cited

U.S. PATENT DOCUMENTS

| | | | | |
|---|---|---|---|---|
| 2015/0001976 | A1* | 1/2015 | Hunstable | H02K 1/30 |
| | | | | 310/154.01 |
| 2015/0035403 | A1* | 2/2015 | Shlakhetski | H02K 29/08 |
| | | | | 310/156.43 |
| 2016/0218606 | A1* | 7/2016 | Radovsky | H02K 1/187 |
| 2018/0375414 | A1* | 12/2018 | Mostovoy | H02K 99/20 |

OTHER PUBLICATIONS

International Search Report, European Patent Office, dated Jun. 3, 2019.
Written Opinion International Searching Authority, European Patent Office, dated Jun. 3, 2019.
International Preliminary Report on Patentability, European Patent Office, dated May 27, 2020.

* cited by examiner

ELECTROMAGNETIC MACHINE COMPRISING STATIONARY FORMER WITH SEGMENTED WINDING STRUCTURE

CROSS REFERENCE TO RELATED APPLICATION

This application is for entry into the U.S. National Phase under § 371 for International Application No. PCT/GB2019/050591 having an international filing date of Mar. 1, 2019, and from which priority is claimed under all applicable sections of Title 35 of the United States Code including, but not limited to, Sections 120, 363, and 365(c) and which in turn claims priority under 35 USC 119 to UK Patent Applications No. 1803360.5 filed on Mar. 1, 2018.

The present invention relates to an electromagnetic machine.

Permanent magnet motors are well known. A traditional form is a DC motor with North and South poles on opposite sides of a rotating armature having a commutator to reverse the polarity of the magnetic field induced by armature windings. The magnetic fields of such a motor are oriented radially of the armature/rotor gap in generating circumferential forces.

In a brushless DC permanent magnet motor, the magnets are arranged on the rotor and the stator has windings. These create magnetic fields to drag the rotor around, with the polarity of each winding being changed as a rotor magnetic pole passes it to repel the just attracted pole and attract the following pole of opposite polarity. Again, the magnetic fields are oriented radially.

Radial electro magnets in rotors and stators add to the mass of their motors. Further, the need for laminations to suppress eddy currents represents a complexity in construction.

Many electromagnetic machines can be operated either as motors to produce power by providing them with current or as generators by providing them with power to produce current.

As used herein:
- a magnet's "pole" is that point from which magnetic field lines are deemed to emanate from in the case of the magnet's North pole and return to in the case of the South pole;
- a magnet's "polar axis" is the line between its North and South poles;
- a magnet's "polar length" is the distance along the polar axis between its poles;
- a pair of magnets are said to have the same "orientation" if their polar axes are aligned and their adjacent poles are the North pole of one and the South pole of the next, whereby they attract each other when close enough;
- "stationary portion" of an electromagnetic machine is that portion which remains stationary, even though the entire machine including the stationary portion may move as a whole. The stationary portion will normally be a stator, which term is used in respect of both rotary and linear machines;
- "moving portion" of an electromagnetic machine is that portion which moves in use with respect to the stationary portion. In a rotary machine, the moving portion is normally referred to as the rotor. No term separate from moving portion is used herein for a linear motor;
- "magnet" is intended to comprise both permanent magnets, electromagnets and parts in which magnetism is induced, unless the context clearly indicate only one type of magnet.

The object of the present invention is to provide to provide an improved electromagnetic machine.

According to the invention there is provided an electromagnetic machine comprising:
- a moving or stationary portion having a plurality of magnets arranged in sequence in the same or alternatingly opposed orientation with a pitch at least substantially double or a multiple of their polar length in a constant cross-section stationary or moving portion space and
- a stationary or moving portion providing the constant cross-section space and having a winding with:
  - shaped parts outside or inside at least part of the constant cross-section space, extending back and forth on respective cross-sections of the space, spaced substantially equally to the polar length or the magnet's pitch, the cross-sections being transverse to a path followed by the moving portion and
  - intervening connecting parts,
- the shaped parts of the winding inducing oppositely directed magnetic fields in or around the constant cross-section space to act on successive poles of the magnets.

Preferably:
- the moving or stationary portion, the first portion, has:
  - an at least notional plane to which it is parallel and:
  - the plurality of magnets carried by the first portion, with:
    - their polar axes at least substantially in the plane and aligned along a straight path or arranged tangentially to a circular path,
    - at least substantially equal spacing along or around the path and oriented the same way or with alternating orientation therealong or therearound with
    - their transverse cross-section defining a surface of revolution or translation and
- the stationary or moving portion, the second portion, has a single former or a compound former with a constant cross-sectional shape following along or around the path and being complementary to the said surface, the second portion having the winding which has a plurality of segments connected in series, each segment having at least:
  - a first of the shaped parts following at least part of a cross-sectional shape of the former, at least partially around the outside or inside the former, with little or no extent in the direction of the path,
  - a first path direction part, being one of the intervening connecting parts, with an extent substantially equal to their polar length in the case of the magnets oriented the same way or the magnets' pitch in the case of alternating magnet orientation respectively, with little or no first shape following extent,
  - a second of the shaped parts also following at least part of the cross-sectional shape, at least partially around the outside or inside the former but in the opposite direction, with little or no extent in the direction of the path, the arrangement being such that a magnetic field induced by a current in the winding in the shaped parts of the winding acts on the magnets.

Also preferably, the segments are connected together by others of the intervening connecting parts remote from the former or formers.

Further preferably, each segment includes:
- a second path direction part, being another of the intervening connecting parts, with a further extent substantially equal to the polar length or magnet pitch respectively, with little or no first shape following extent.

The former can be a single former extending the extent of the segments. Alternatively, the former can be a compound former comprised of a number of short winding formers, the compound former extending the extent of the segments.

In readily assembled embodiments, there are more magnets than segments.

Whilst the machine can be supplied bare, normally it will include:
means for sensing the position of the magnets relative to the winding and
means for applying current to the winding, the means current applying means alternating it in accordance with the sensed magnet/winding position.

The sensing means can be comprise Hall Effect sensors suitably positioned with respect to the magnets relative position with the coils, to time the current applying means. Alternatively, optical sensors can be used, with the magnets painted black and white timing marks applied to the magnets.

In certain embodiments, particularly using magnets that are thin with respect to the windings in the direction of movement along the path:
the shaped parts of the winding are divided into multiple phases in the path direction and
the current applying means is adapted to supply multiphase current to the phases of the winding, in accordance with the position of the magnets relative to the winding.

The magnets can be arranged in the same, NS NS NS, orientation with the back and forth shaped parts of the winding alternatingly arranged adjacent to each other.

Alternatively, the magnets can be arranged in alternatingly opposed, NS SN NS, orientation, with:
the back and forth shaped parts of the winding arranged to have current applied to them as separate phases and with:
two back shaped parts adjacent to each other, followed by
two forth shaped parts adjacent to each other
and so on and
a first of the back shaped parts being connected to a first of the forth shaped elements with one of the intervening parts between them and a second of the back shaped parts being connected to a second of the forth shaped elements with one of the intervening parts between them
the arrangement providing two phases, which can each be subdivided into three phases or be connected without sub-division.

The intervening connecting parts can be continuously curved in a plane at least substantially orthogonal to that of the shape parts.

Normally the winding has multiple loops or coils, with each loop having an opposite, return, intervening-connecting part connecting the end of one back shaped part to the beginning of the next forth shaped part.

Normally, the electromagnetic machine will be a motor. However, it could be a dynamo/alternator. In either case, the machine can be linear, but is preferably rotary.

In the preferred embodiment, the magnets are provided inside the cross-sectional shape or space. However it is envisaged that they could be shaped to at least partially enclose it.

Further with a suitable brush arrangement, the winding could be included in the moving portion with the magnets stationary. However the opposite is preferred.

In the case of a rotary machine, wherein the rotating portion is a rotor, this can be skeletal or a disc. Further in this case the constant cross-section space will preferably be toroidal.

The magnets will normally be permanent, but they can be electromagnets, with slip rings being provided via which they can be energised. It is also envisaged that the magnets could have their magnetism induced by the winding, as in an induction motor. In the case of a rotary machine, the magnets are preferably arranged with their polar axes on a central plane of the rotor. However they could be arranged to one side of a rotor disc, particularly where a second set of magnets is arranged on the other side in a second toroidal space with a second winding. In such arrangement, the first and second magnets and/or their windings can be angularly offset to provide a more even torque generation.

Where the toroidal space is provided in between two formers assembled on either side of the rotor before winding the winding, the winding will captivate the rotor if wound around the greater part of the cross-section of the toroid. Alternatively, the formers can be arranged for the winding to extend over less than half the cross-section and two such complementary formers and windings can be assembled to opposite sides of the rotor. In such arrangement, the windings on the former can be staggered for more even torque.

Whilst the magnets can be of other cross-section themselves, such as rectangular, they are preferably of circular cross-section. The toroidal cross-section will normally be complementarily shaped. Again the magnets can be straight for simplicity, in which case their polar axes will be straight. Alternatively they, and their polar axes, can be curved complementarily to the curvature of the toroid.

The magnets can be solid in that their polar axes pass through their bodies. Alternatively, they can be hollow, with their axes passing down their central void. Whilst this arrangement may have little effect on torque, the resultant motor can be lighter.

The inter-magnet spaces can be left empty. However, in the interest of friction reduction they can be filled.

For driving the motor, a positive and negative going square wave generator can be provided. Further it is advantageous to provide a space between each positive and negative pulse to guard against unintentional retardation. Equally the length of the inactivation space between the positive and negative can be adjusted to control torque output.

To help understanding of the invention, a specific embodiment and variants thereof will now be described by way of example and with reference to the accompanying drawings, in which.

Figure 1:
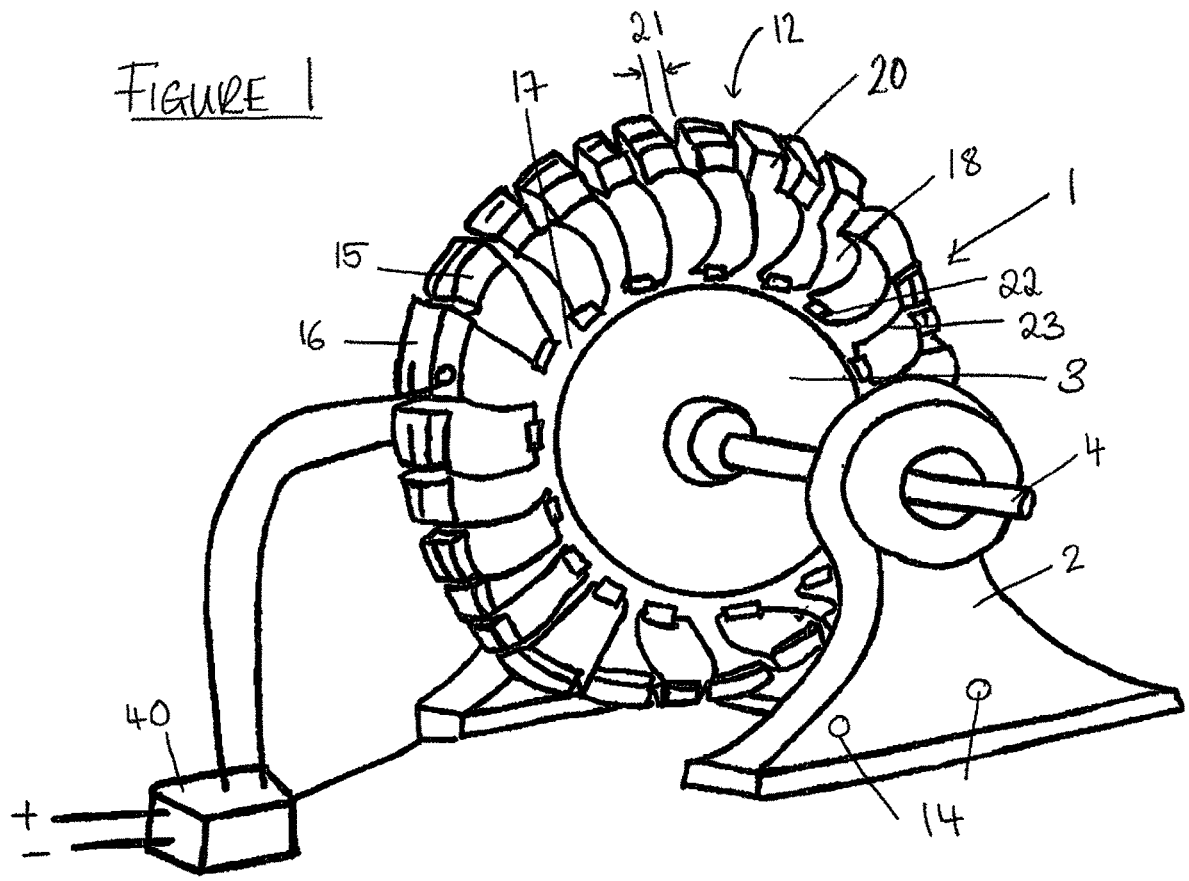
FIG. 1 is a perspective view of a first electric motor in accordance with the invention.
Figure 2:
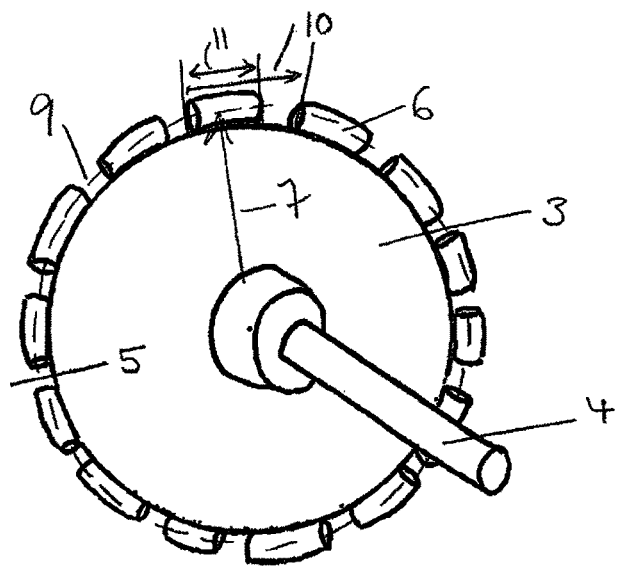
FIG. 2 is a similar view of a rotor of the motor of FIG. 1.

Referring to FIGS. 1 to 7 of the drawings, the motor 1 in accordance with the inventions thereshown is a prototype and a variant 101 thereof The motor has a pair of journal supports 2, between which is journalled a rotor 3 on a shaft 4. The rotor has a disc 5 fast with the shaft and at right angles to it, whereby it rotates without wobble. At the circumference of the disc, a plurality of short, circular cylindrical permanent magnets 6 are held:

all at the same radial distance 7 from the shaft to their polar axes, all being tangential to the disc at their mid-point, with their polar axes in the central plane of the disc and the midpoints of the axes on a circular path 9 of radius 7, and all being equally spaced around the disc with an angular pitch 10 equal to double their polar length 11.

A stator 12 is carried by the supports on rods 14. It comprises two formers 15,16 made by 3D printing in the prototype. Each has an inner annular flange 17, flanking the disc within the radius of the radius of the magnets with clearance. Around the magnets, the formers are have semi-toric formations 18, which together provide a toric void in which the magnets rotate. The individual formers have fingers 20 extending in the plane of flanges 17. The fingers are spaced with winding gaps 21. The angular pitch of the gaps 21, and of the fingers, is one half of the pitch 10 of the magnets. At the outside of the formations, where they adjoin the flange 17, inwards of every other finger 20, lips 22 for a winding 23—to be described—are provided. These are at the angular pitch of the magnets.

Before describing the winding, it should be noted that magnets are spaced close to the inside of the semi-toric formations and that the formations are thin. Further the formations are of low magnetic permittivity. Whilst these factors are relative, the intention is that the magnets in their rotary passage should experience the magnetic field of the windings on the outside of the formations.

The winding can be described as:

Under the lip 22 on one side;

Over and around the formations 18 via the next gap 21,

Under the lip on the other side, the lips being interdigitated from side to side and Back around the formations, via the next gap again.

The result is, for each magnet pitch that the winding has the following parts, starting with the second bullet point above:

1. From the lip & around the formations, a first shaped part 31 following the toroidal shape of the formation, through most of a full turn, with negligible extent in the direction of rotation;

2. A first part 32 in the direction of rotation, which has an angular extent equal to the extent of the lip, which is that between the gaps and in turn angularly equal to the permanent magnets polar pitch;

3. A second shaped 33 part again following the formations and through the next gap with negligible rotation direction extent; and 4. A second part 34 in the direction of rotation through a magnetic pitch and under the lip on the other side.

Figure 3:
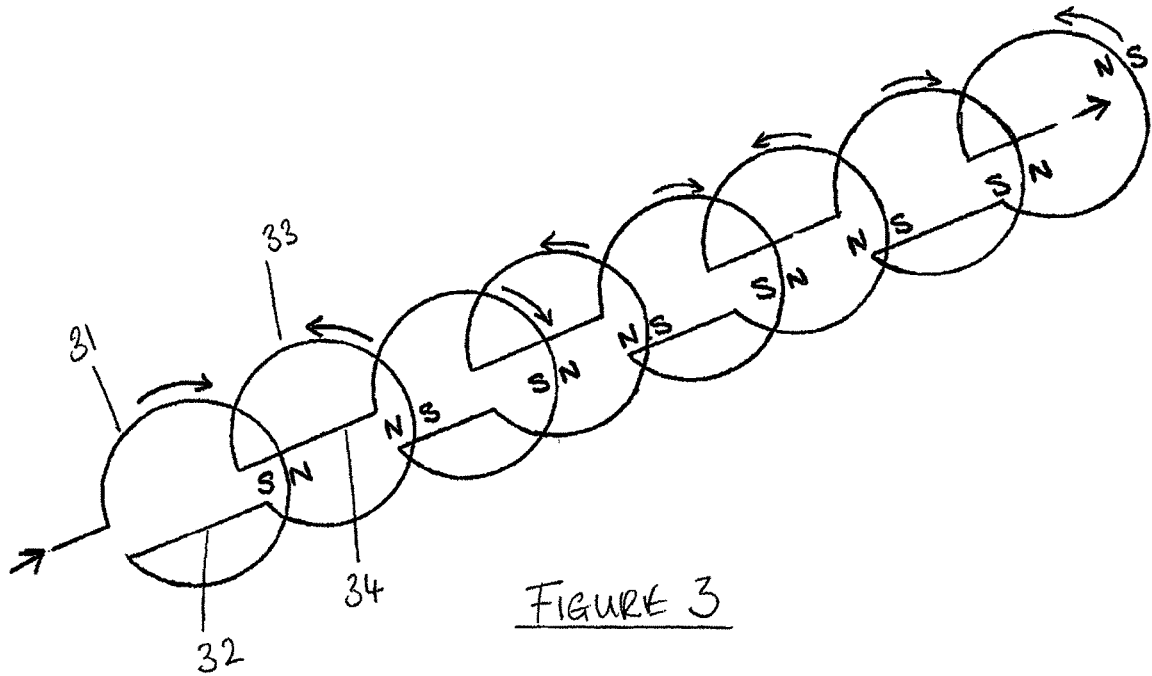
FIG. 3 is a diagrammatic perspective view of a stator winding of the motor of FIG. 1, with the tonic shaped winding shown straightened and induced magnetic fields shown for current flow in one direction.
Figure 4:
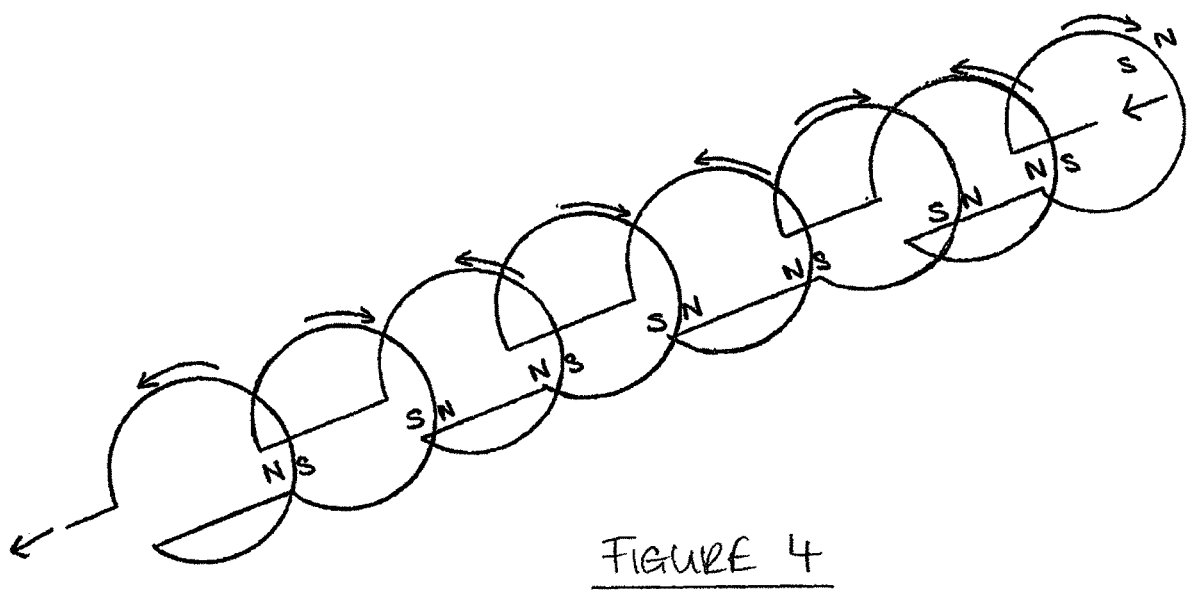
FIG. 4 is a view similar to FIG. 3, with opposite current flow and opposite induced magnetic fields.

The arrangement is such that magnetic fields are induced in the toric void, at least at its outside when viewed in cross-section, that is to say immediately within the formations 18. It is the shaped winding parts 31,33 that induce the magnetic fields. Applying the right hand rule to current flowing in these parts, it will be appreciated that the field induced by the same current flowing in them will be equal and opposite, separated by the pitch of these parts 31,33, as shown in FIGS. 3 & 4. Equally, they are separated by the pitch 34 of the poles 36, 37 of the magnets. The poles 36, 37 are designated N,S in FIGS. 5 & 6. This pitch is half the pitch 10 between the magnets, i.e. it is equal to their polar pitch. At the positions shown in FIGS. 5 & 6, the magnets shown will all be drawn in the direction of rotation R of the rotor, by the fields shown as N,S at the winding parts 31,33, taking account of current reversal—now described.

Once the magnet poles 36,37 have passed the winding parts 31, 33 by half their polar length, there will be a tendency for the magnets to be drawn back towards the winding parts. However:

1. Momentum will carry the rotor forwards and

2. As explained below, with reversing of the current direction, the poles will be repelled and pushed on their way.

Further current reversal will cause the magnets to be attracted to the next set of winding parts. Thus the magnets are attracted and repelled successively as the rotor rotates.

For reversing the current in the winding, a drive circuit 40 is provided. It comprises a power transistor bridge circuit, having two transistors 41,42 in one leg and two transistors 43,44 in the other leg. The winding 23 is provided between the common points of the transistors in the two legs. For switching the transistors a logic circuit 45 is provided with two Hall effect sensors 46,47 provided on the stator to detect and switch state in accordance with detected magnetism. The sensors are slightly spaced in the direction of rotation, that is by 10% or less of the magnets pitch 10, and are of the type whereby when a North pole passes, they switch high and when a following South pole passes they switch low. The logic circuit is arranged to:

1. switch all four transistors off when one sensor is high and the other is low;

2. switch transistors 41,44 ON, and the others OFF, when both sensors are high; and 3. switch transistors 42,43 ON, and the other OFF, when both sensor are low.

Figure 5:
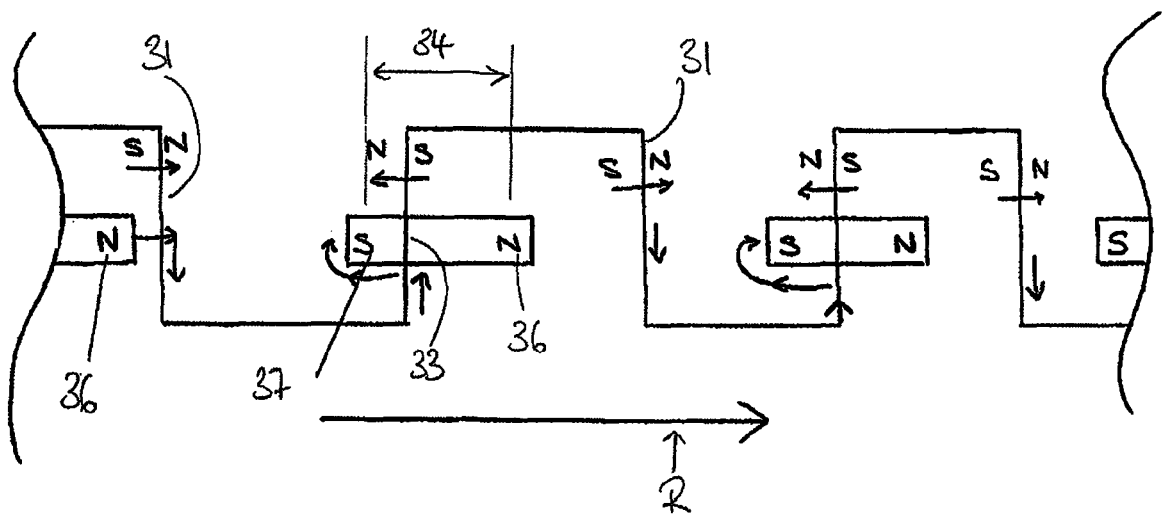
FIG. 5 is a two dimensional diagrammatic view of the stator magnetic fields acting on rotor magnets.

Thus with the transistors being switched successively, to switch successively the current, the induced magnetic fields attract and repel successively the poles of the magnets as they pass the winding parts, i.e. drive the rotor in rotation. In more detail, with the North poles of the magnets leading, they are attracted to respective winding portions when the current in these is such as to have induced a South pole in front of the magnets, as shown in FIG. 5. This is state (2) above of the transistors. By analogy with an armature being drawn into a solenoid winding until it is in the middle of the winding, the magnet continues to be drawn into the winding portion until half way through. Thereafter it would be drawn back, except that the transistors are switched at this point and the direction of action of the winding portion on the magnet is reversed. This is state (3) above of the transistors. It is expelled from the other side of the winding portion, with its North pole being attracted to the next winding portion, and so on. The slight spacing of the Hall effect sensors allows time for the magnetic fields to decay before the middles of the magnets reach the winding portions. This is state (1) above of the transistors. Equally the reversed magnetic fields are re-established after the middles of the magnets have passed the winding portions. The result is avoidance of a switch timing error or a winding or magnet position tolerance causing a retardation on a magnet. Further it should be noted that torque attraction/repulsion exerted on the magnets is lowest closest to when the middles of the magnets are at the shaped winding parts. Thus there is negligible loss of torque from the state (1) of the transistors, otherwise referred to as the off state.

Figure 8:
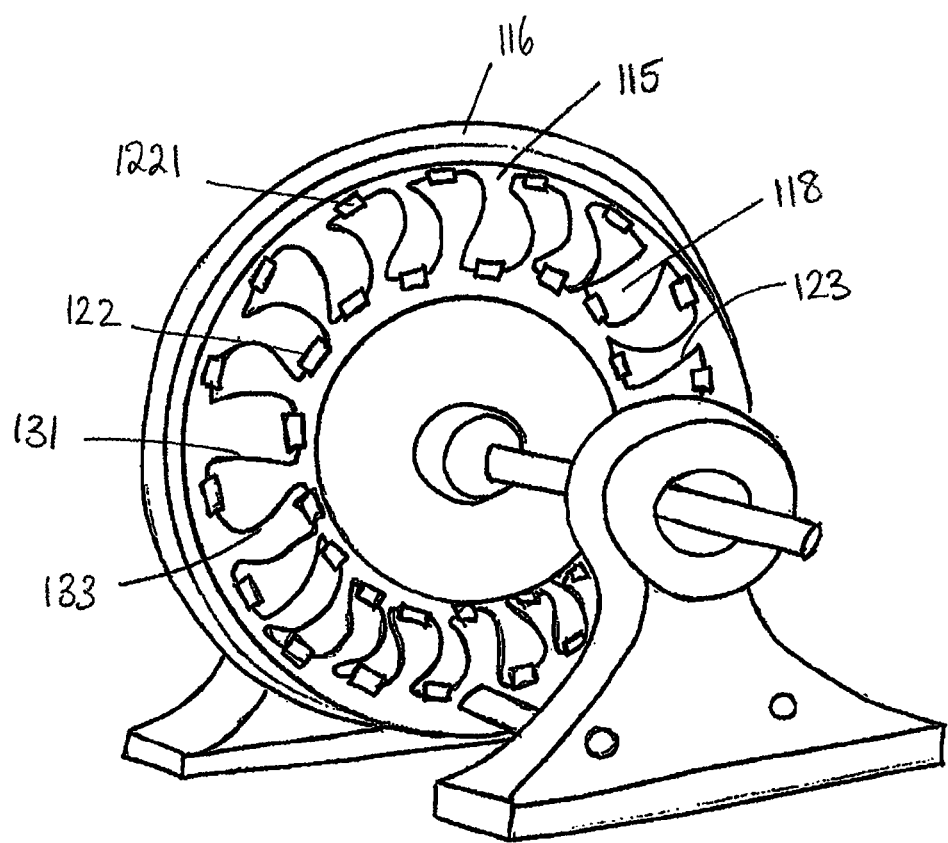
FIG. 8 is a view similar to FIG. 1 of a variant of the motor of FIG. 1.
Figure 9:
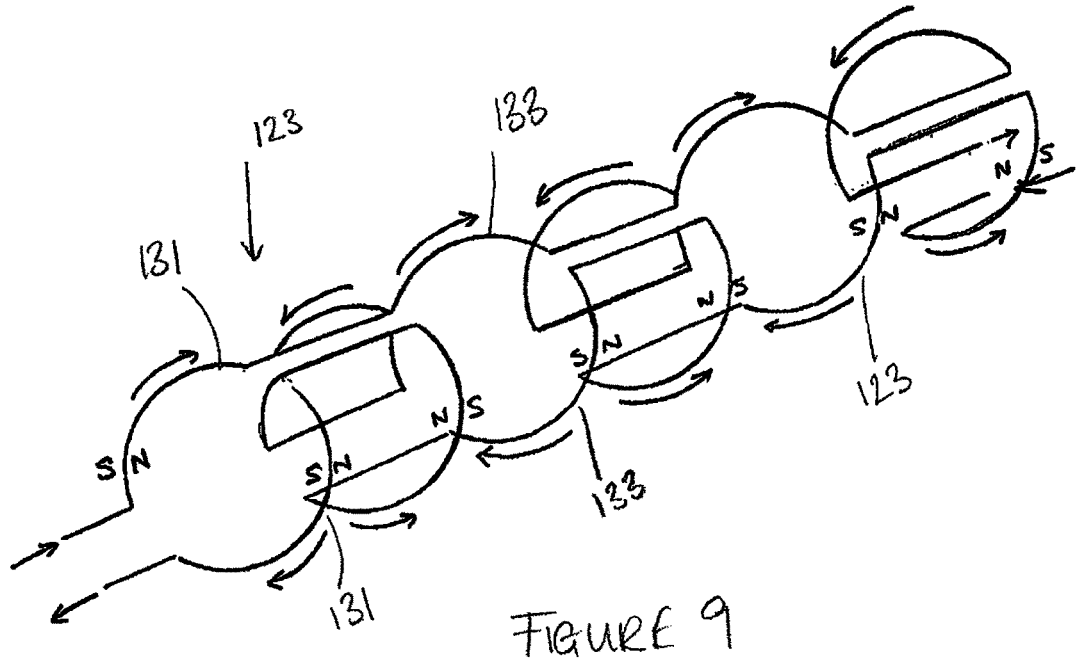
FIG. 9 is a view similar to FIG. 3 of a stator winding of the variant of FIG. 8.
Figure 10:
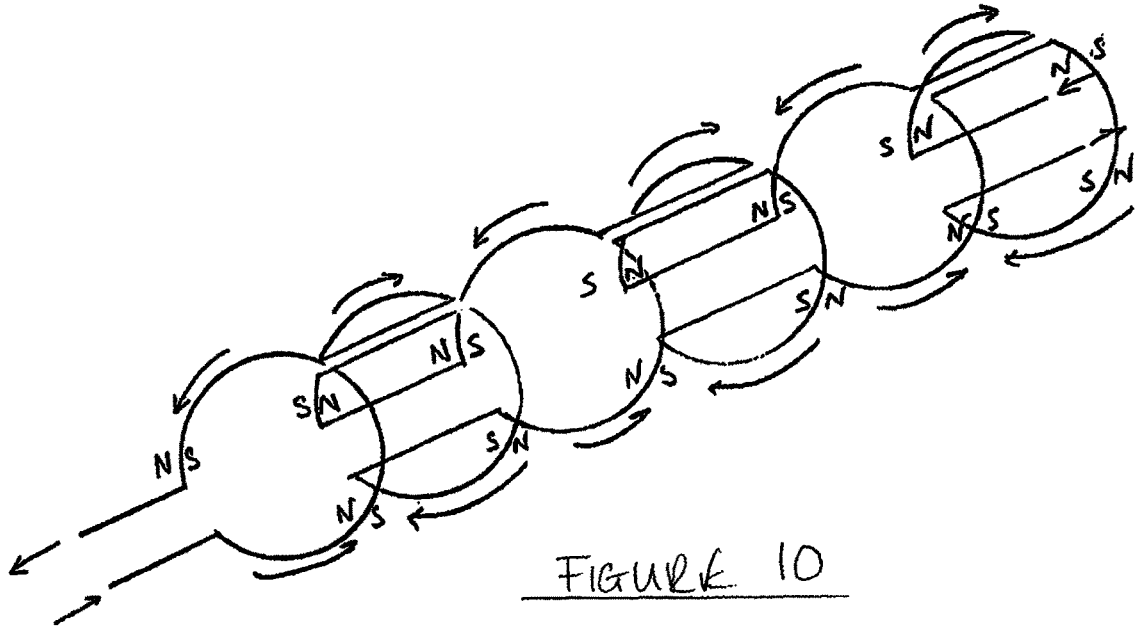
FIG. 10 is a view to FIG. 4 for the variant.

Turning to the variant of FIGS. 8 to 10, the formers 115,116 are essentially the same shape as the formers 15,16, however they do not have fingers 20 and gaps 21, rather they have outer winding lips 1221. These are radially outwards of their semi-toric formations 118 and angularly interdigitated with inner winding lips 122, similar to the lips 22. Each former 115,116 has its own winding 123, semi-toroidal shaped parts 131 and 133, passing out from the inner lips 122 to the outer lips 1221. These windings are essentially the same as the windings 23, except that they extend for half only of the extent of the latter, Each formation having its own winding 123, the combined effect of the two, which are angularly aligned is the same as the winding 23. The advantage of this arrangement is that the two formers with their windings can be assembled together on either side of the rotor after placing of the windings on the formers.

Figure 11:
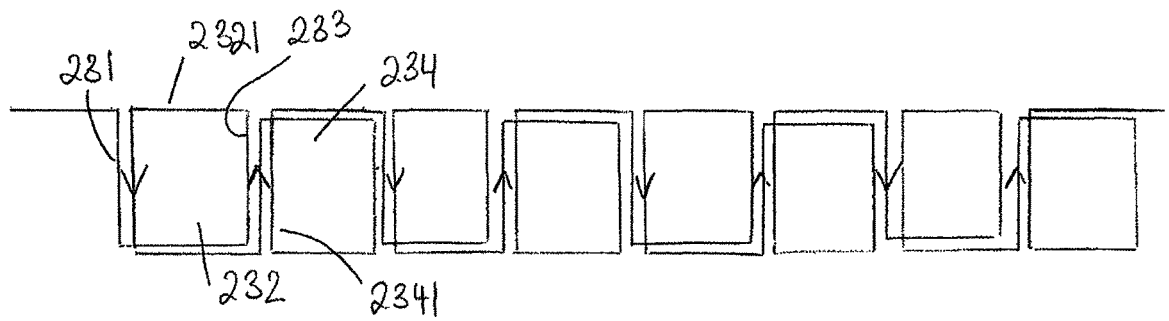
FIG. 11 is a winding wiring diagram with additional winding coils for additional induced flux density.
Figure 12:
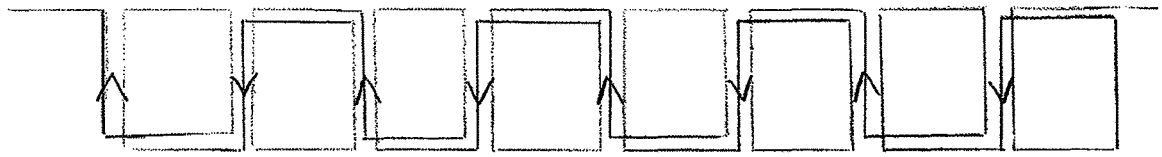
FIG. 12 is the same diagram as that of FIG. 11 with the current flow reversed for reversed induced flux.
Figure 13:
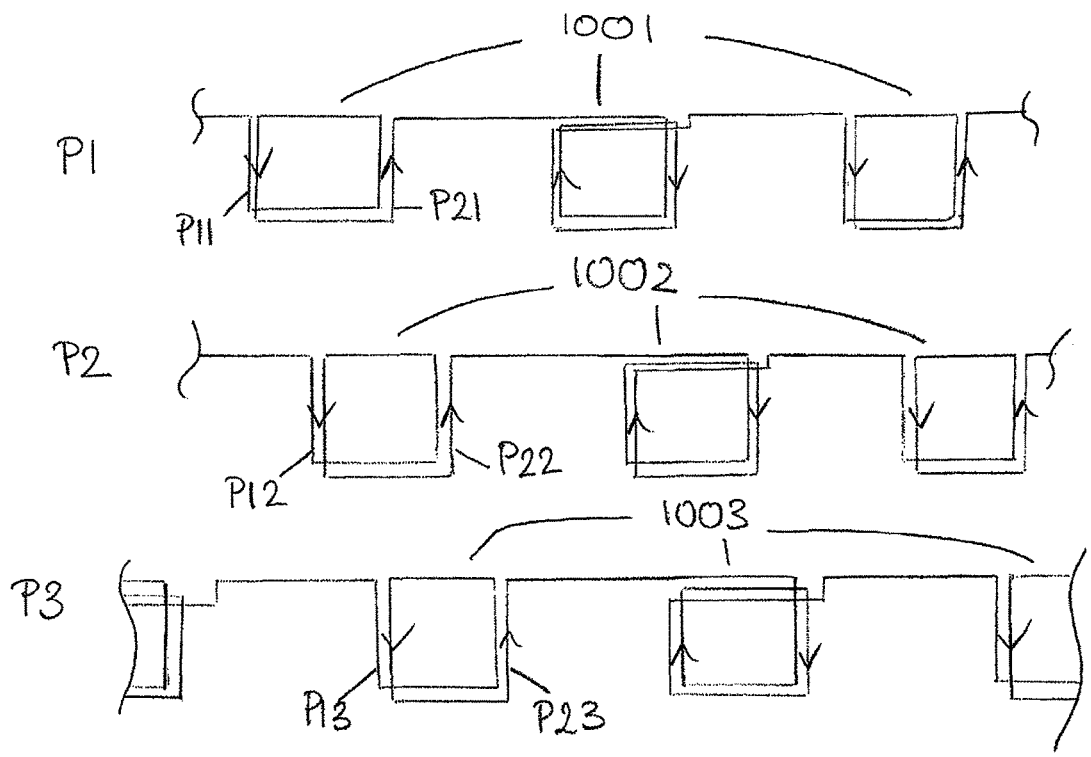
FIG. 13 is a similar three phase diagram for a second motor of the invention.

Turning on to FIGS. 11 to 18, the single coils of FIGS. 3 & 4 are replaced by multiple coils multiplying the field generated by at each coil and multiplying the torque exerted on the shaft by multiplying the force exerted on the magnets. In more detail, the winding parts 231,232,233 are direct counterparts to the parts 31,32,33. However, at the end of the curved part 233, instead of continuing as part 234, it returns opposite part 232 as part 2321. It then follows along the part 231 doubling up the induced flux here. Next it follows 232 and then doubles up 233. After this the winding does follow 234 and so on. When it returns as part 2341, it adds a third wire to the curved part 233. So at this point the induced flux is trebled. The winding continues as shown in FIG. 11. FIG. 12 shows reversed polarity on current reversal. Within the confines of space for the wire, the windings can be made with more returns and consequently stronger flux induced at the curved parts.

We have found that magnets spaced relatively far apart, allowing use of stronger magnets, is a good choice. However, the torque generated by the motor can be irregular. In order to address this, we prefer to use three phase windings, that is to say three identical windings set at equal pitches and off-set by ⅓ of the pitch, the one from the next. The drive circuitry energises them at 120° from each other, by addition of extra sensors and transistors in a drive circuit such as 45. The winding arrangement is shown diagrammatically in FIG. 13. Whilst the three windings 1001,1002,1003 are shown separately, in practice they are super-imposed, that is with the curved aparts inter-digitated in the direction of magnet movement.

Figure 14:
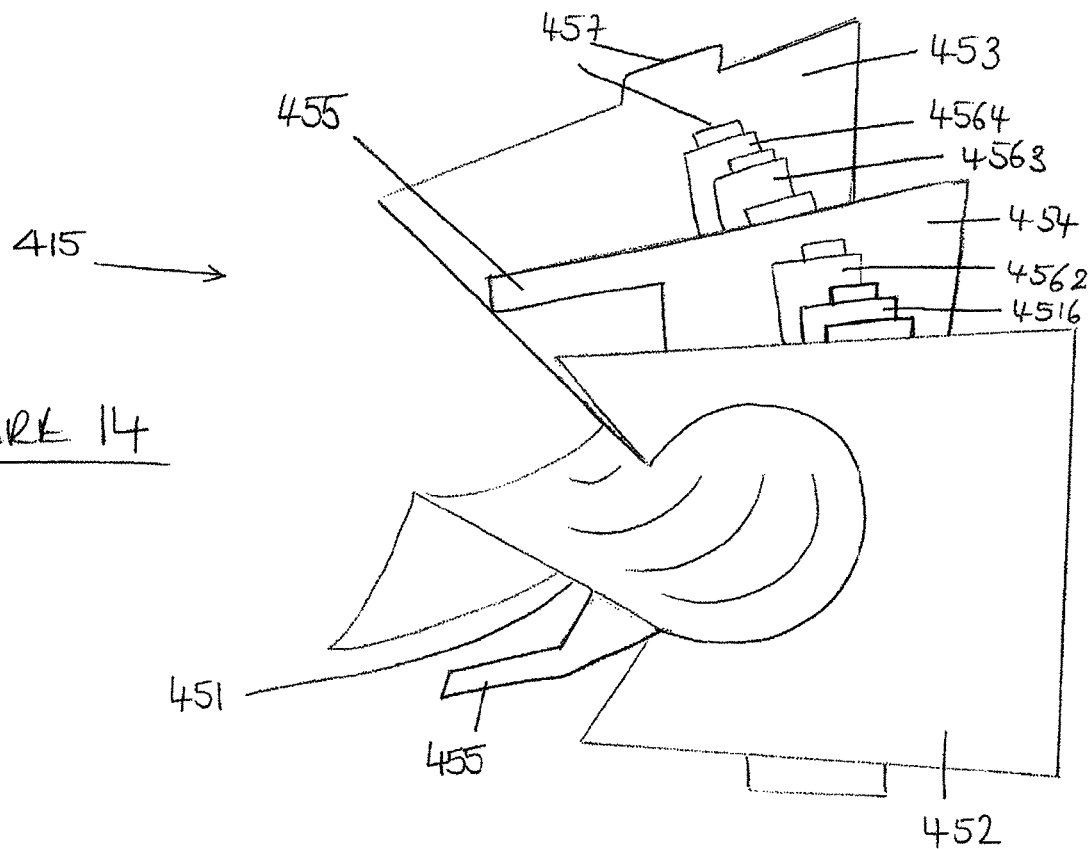
FIG. 14 is a perspective view of a winding former for the second motor.
Figure 15:
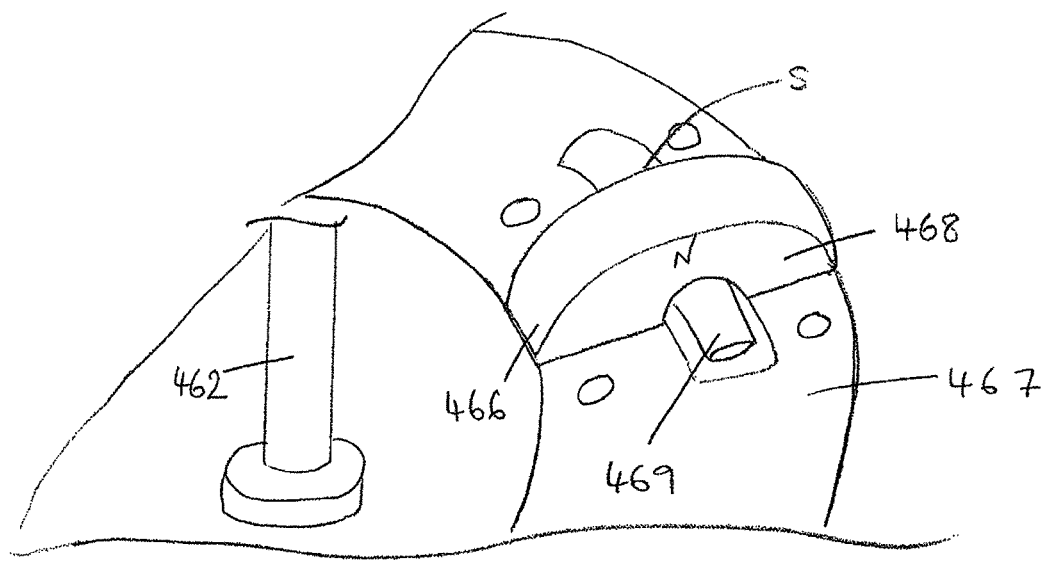
FIG. 15 is a similar perspective scrap view of a part of a rotor and one magnet for the second motor.
Figure 16:
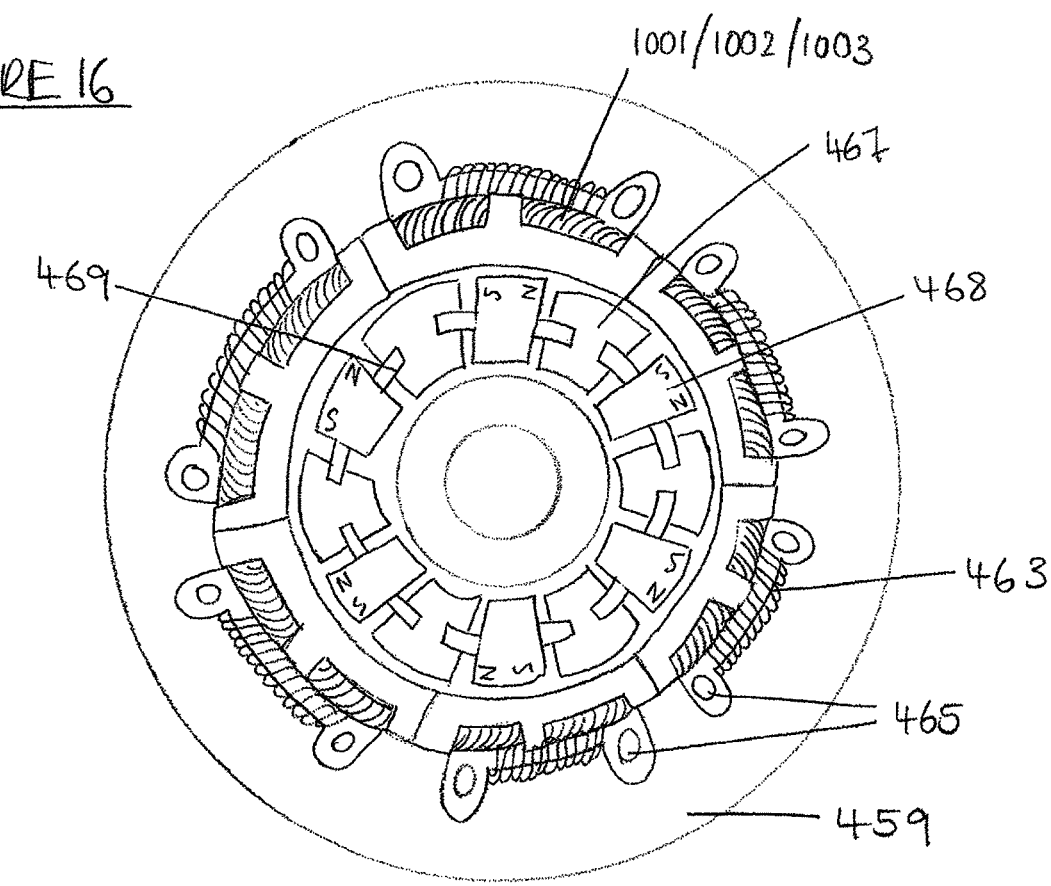
FIG. 16 is a central cross-sectional end view of the second motor.
Figure 17:
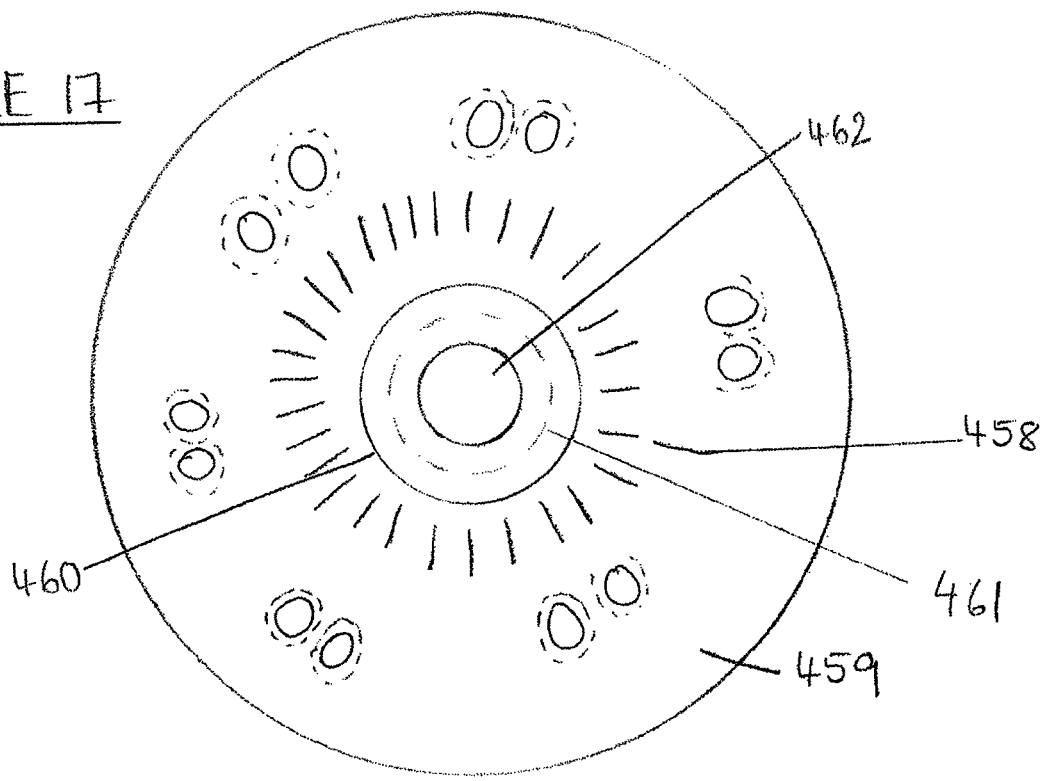
FIG. 17 is an end view of the second motor.

At least in prototype form, we find it more convenient to wind the windings on segmental formers 415, as shown in FIG. 14. These have part toroidal magnet tube parts 451, bearing in mind that they are open inwards of their curvature for the motors rotor disc 405. The shape is the locus of a thumb and index finger moved circularly about a point on line projecting from between the thumb and index finger. The segmental formers have end flanges 452, 453, and a central flange 454, all set radially with respect to the toroidal centre 450. The flanges are generally rectangular in outline, with the central one formed with fingers 455 projecting generally inwards in the direction of the toroidal centre, tangential to its magnet tube part, with the two fingers 455 parallel to each other. The end flanges have a triangular shape where the central on is tongue-like. On opposite sides of the segmental formers, they have four spacers 4561,4562, 4563,4564 between the central flange and the end flanges. The structure allows the winding of three phase windings as described below. The flanges and the dividers have lips 457, which project in use in slots 458 of end plates 459. Centrally the end plates have housings 460 for bearings 461 for a rotor shaft 462. Outwards of the formers, closure members 463 with studs 464 are provided. The studs extend through the plates to washers and nuts 465 holding the plates against the formers. The formers are conveniently of 3D printed or injection moulded plastics material, whereas the plates are conveniently of glass reinforced plastics material.

The winding is awkward to show graphically but is as follows:

i. Phase 1 winding P1 is from the space between the end flange 452 and spacer 4561, under the central flange finger 455 on one side of the magnet tube 451, around the tube between the central flange 454 and the spacer 4563, back under the finger 455 on the other side and back into the space between the end flange 452 and the spacer 456. The winding is given ten turns, with the ends left free;

ii. Phase 2 winding P2 is similar, namely from the space between the spacers 4561, 4562, under the finger 455 on the same first side of the magnet tube into the space between the spacers 4563,4564, around to the finger on the other side and then back into the space between the spacers 4561,4562. The winding is given the same number of turns;

iii. Phase 3 winding P3 is again similar, with ten turns in the space between the spacer 4562 & the central flange 454 and the space between the spacer 4564 and the end flange 453.

For a six magnet motor, five only segmental formers are wound in all per motor. Each has a circumferential extent of ⅙ of 360°, i.e. 60°. The phase 1 windings of the formers are connected in series, as are the phase 2 and phase 3 windings. A 60° gap exists between the angularly abutted, series connected windings, as will be explained below.

The rotor disc 405 is of aluminium, with cut-outs 466. Aluminium plates 467 are riveted on either side of the disc, to assist in circumferential location of the magnets 468 by abutting against them. The also locate aluminium rods 469 passing through the magnets to locate then radially. The sequence of assembly of the motor is as follows:
1. The disc is assembled to the shaft and made fast thereon by known means;
2. The shaft is past through each bearing 461 with the plates slightly separate from their final position;
3. The wound formers are assembled radially inwards and when in position the closures are added and the plates fixed in place. A gap is left between the first and fifth former;
4. Each successive magnet with it rod in place is assembled to the disc in the former gap. One after the other the magnets are fitted and rotated into the formers.

The final assembly of the magnets is symmetrical and balanced even although there is a gap in the formers. Optical sensors are mounted in the gap. They are connected to a circuit such as that described in relation to FIG. 4, but adapted to supply the three phases. Alternatively, three circuits and three appropriately place pairs of sensors can be provided to supply the three phases.

Figure 18:
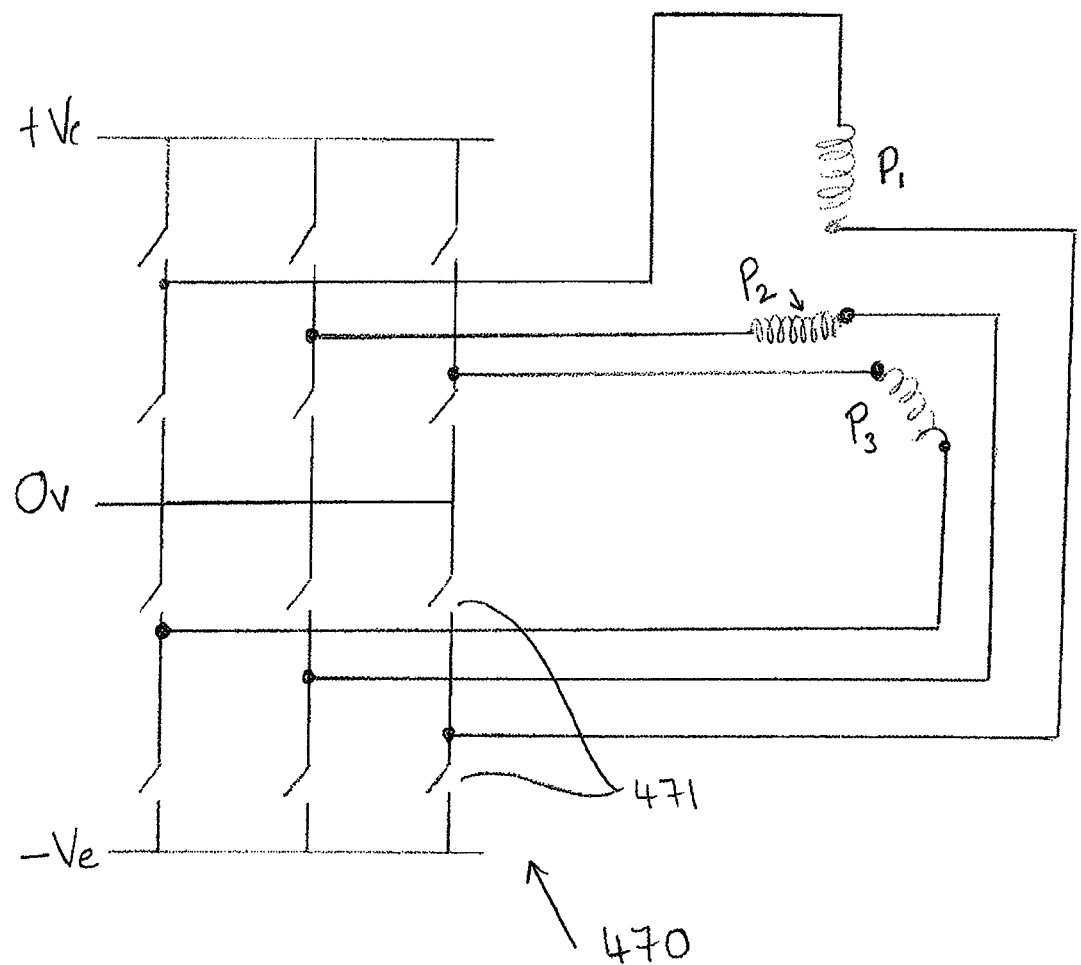
FIG. 18 is a circuit diagram of a power circuit for the second motor connected to its three phase windings.
Figure 19:
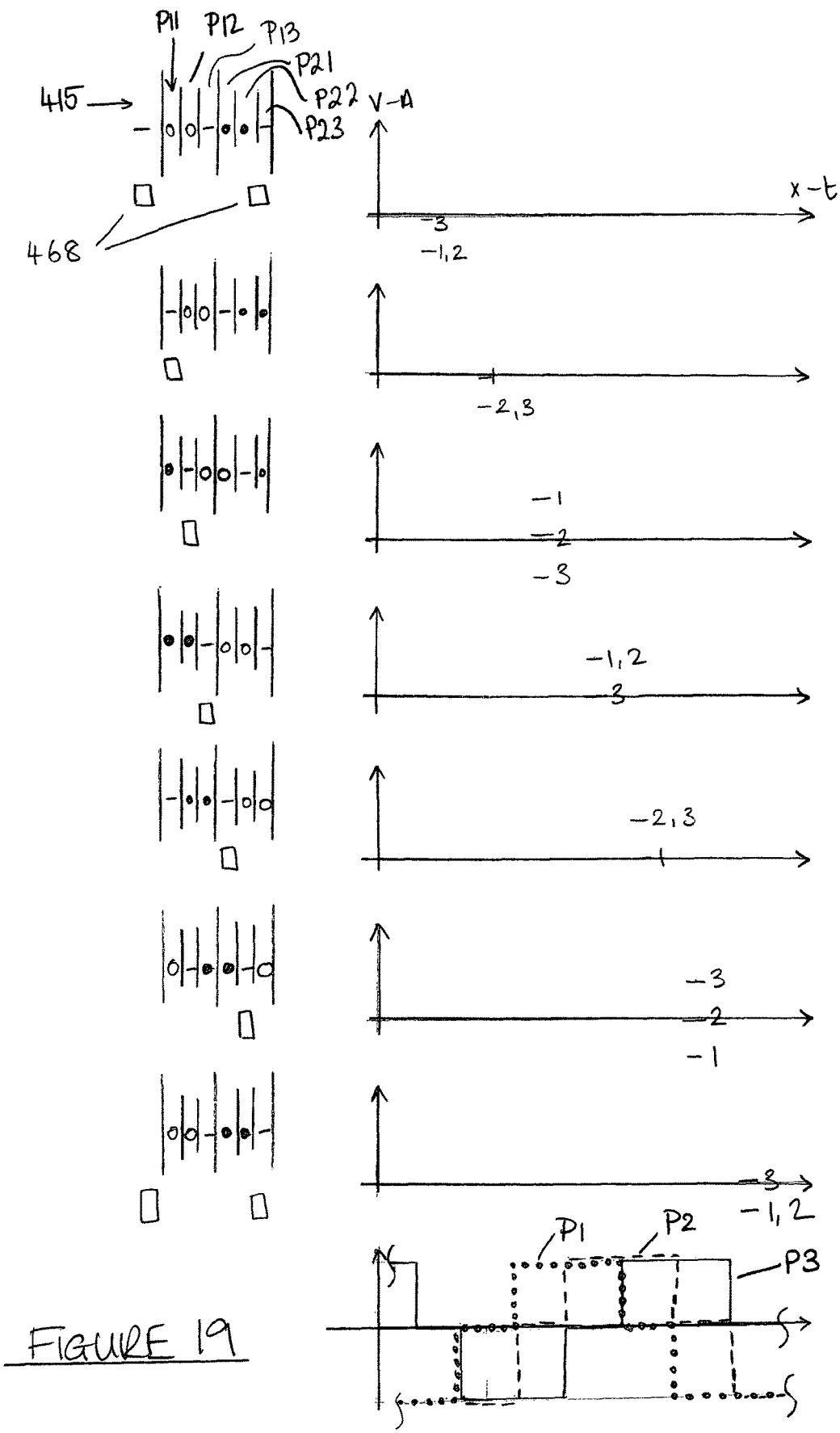
FIG. 19 is a timing diagram for the three phase windings of the second motor.

A suitable circuit and star winding of the three phases is shown in FIG. 18. It shows the current supply circuit 470 having twelve transistors 471 in six pairs connected to the three phases windings P1, P2, P3. Given the description above of the circuit 45, it will be within the abilities of the skilled many to arrange the sensors to provide powering of the phases in accordance with the timing diagram of FIG. 19. In operation, as a thin magnet, of the order of the width between a former flange and the next spacer:

1. approaches the windings of one former it experiences attraction by the first phase 1 winding portions P11,P12 to which the circuit 470 has switched +ve current, the designation +ve designating that taking account of the polarity of the magnet and the winding direction of the portion, the current attracts the magnet.
2. The magnet moving within this winding portion P11, the portion is switched to zero current and the portions P12,P13 are switched on with +ve current, attracting the magnet.
3. When the magnet is within P12, the portion P11 is switched to −ve current repelling the magnet. This current attracts the magnet in the oppositely wound portion P21, whilst the portion P13 remains attracting with +ve current. Portion P12 is switched off;
4. With the magnet attracted within P13, which is switched off, −ve current is switched to P12 as well, so that it, together with P12 repels the magnet and P21 & P22 attract the magnet;
5. Once the magnet is within P21, this is switched off with P11 also being off. −ve current is maintained in P12 and switched on in P13, with P22 & P23 attracting;
6. The magnet moving to P22, the current in P11 is switched +ve for attracting the next magnet, which is of the same orientation, with P21 now repelling the first magnet, whilst the −ve current in P13 causes attraction by P23;
7. Lastly in this sequence which is about to be repeated for the next magnet, with the first magnet within P23, the current in P12 is switched off whilst that to P13 is switched off.

It will be noted that this sequence has been described with reference to the current directions in P11,P12,P13 giving attraction/repulsion to the magnet in adjacent portions. A given direction in these portions provides the opposite effect on a magnet similarly positioned in P21,P22,P23, due to the opposite winding direction of these portions.

Figure 6:
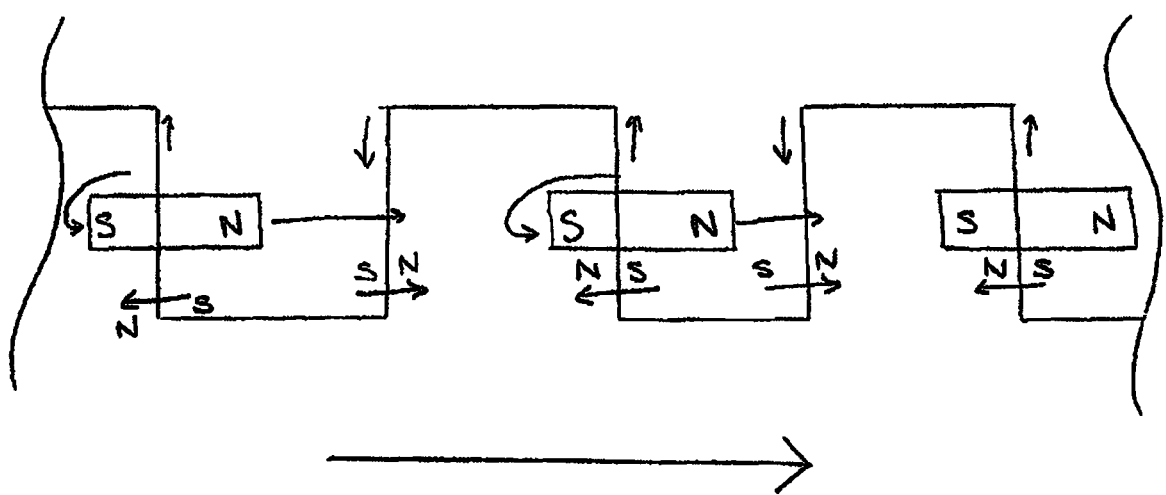
FIG. 6 is a view similar to FIG. 5 with the magnets advanced and the stator winding current reversed.
Figure 7:
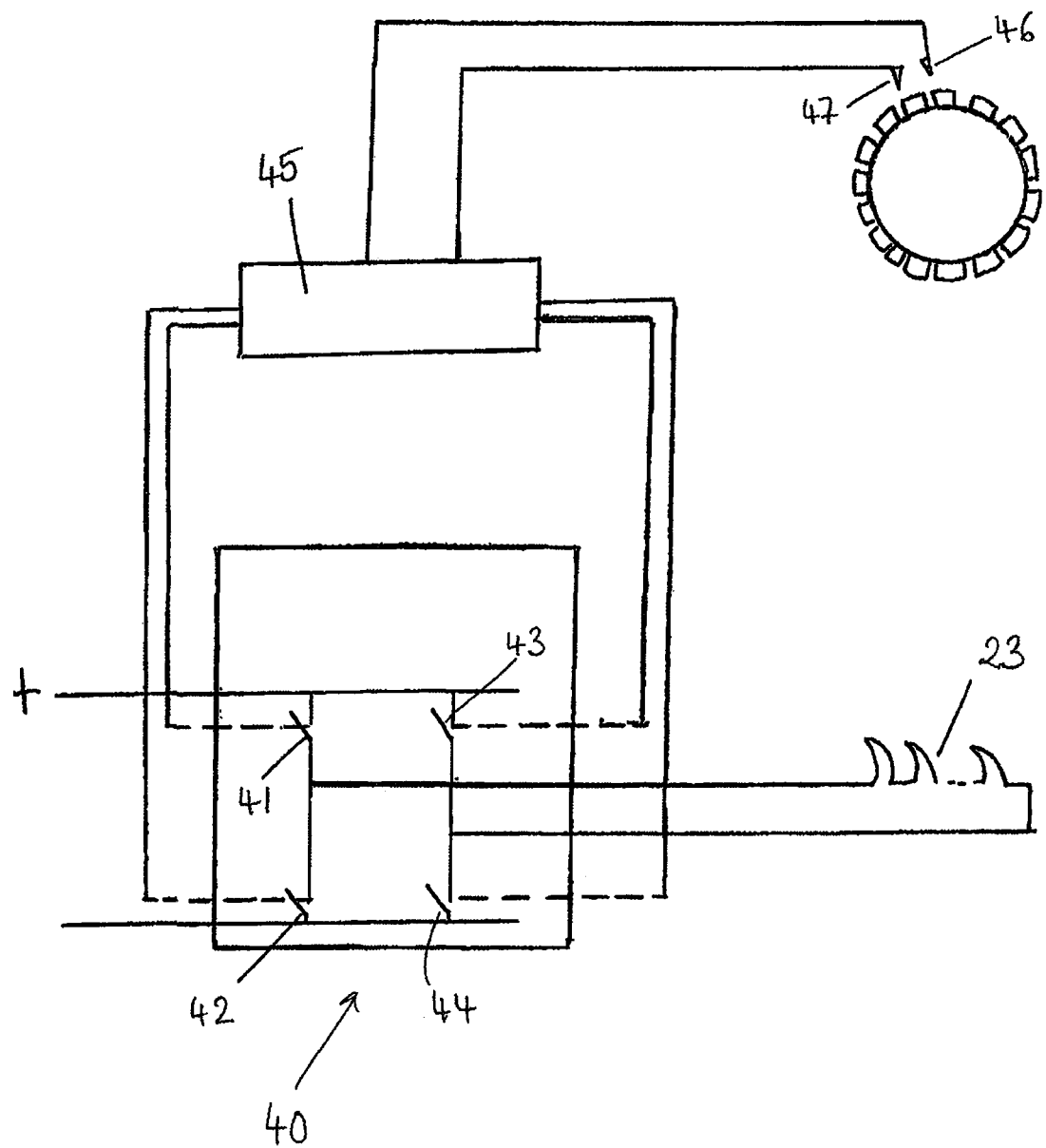
FIG. 7 is a block diagram of a drive circuit for the electric motor of FIG. 1.

Whilst the description so far has been in terms of induced polarity of flux of the windings, it can be thought of in terms of Fleming's left hand rule. According to this, with the field in the direction of the index finger and current in the direction of the current carrier represented by the second finger, the force on the current carrier is in the direction of the thumb. As shown in FIGS. 5 & 6, which are diagrammatic in showing the magnets much smaller than the windings, much of the magnetic flux passes straight from the N pole of one magnet to the S pole of the next. A minor proportion only flows back around the outside of the magnets. With a small air gap between the magnets and the formers, the formers' tube walls being thin and the windings being close to the tube walls, the curved portion of the windings intercept this radial flux at the magnet gaps and current in the windings gives rise to the motor torque in accordance with Fleming's left hand rule.

Figure 20:
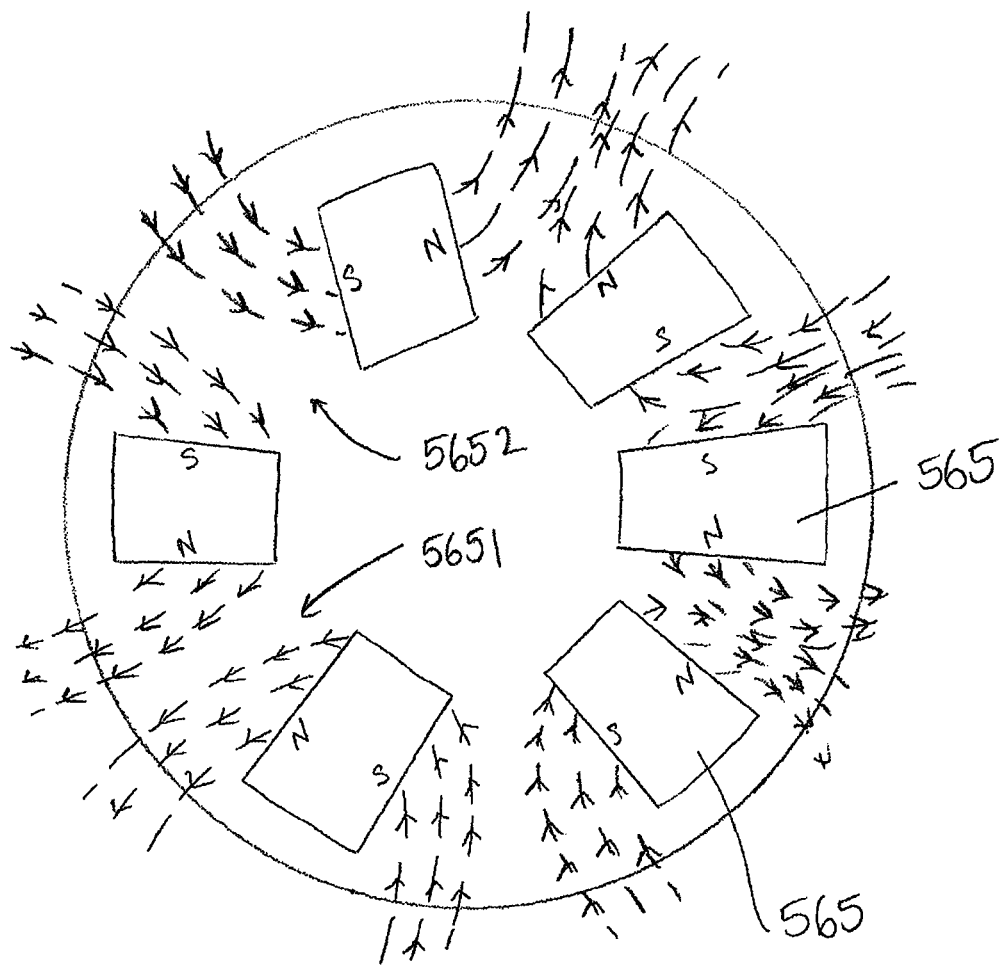
FIG. 20 is a flux diagram of flux from the magnets of a third motor, the magnets being arranged to be alternatingly opposed.
Figure 21:
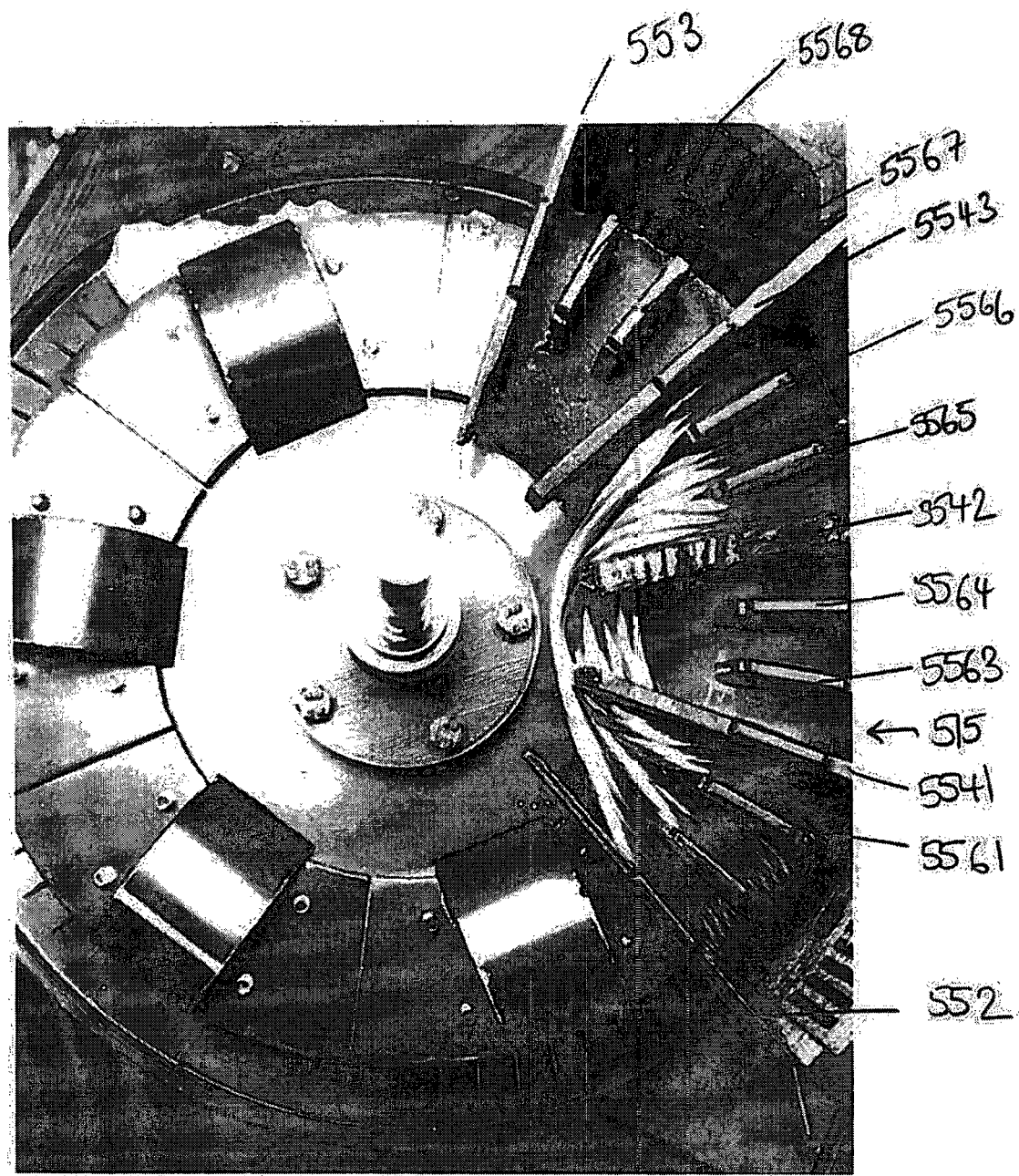
FIG. 21 is an end view of a rotor and magnets of the third motor with one partially wound winding former.
Figure 22:
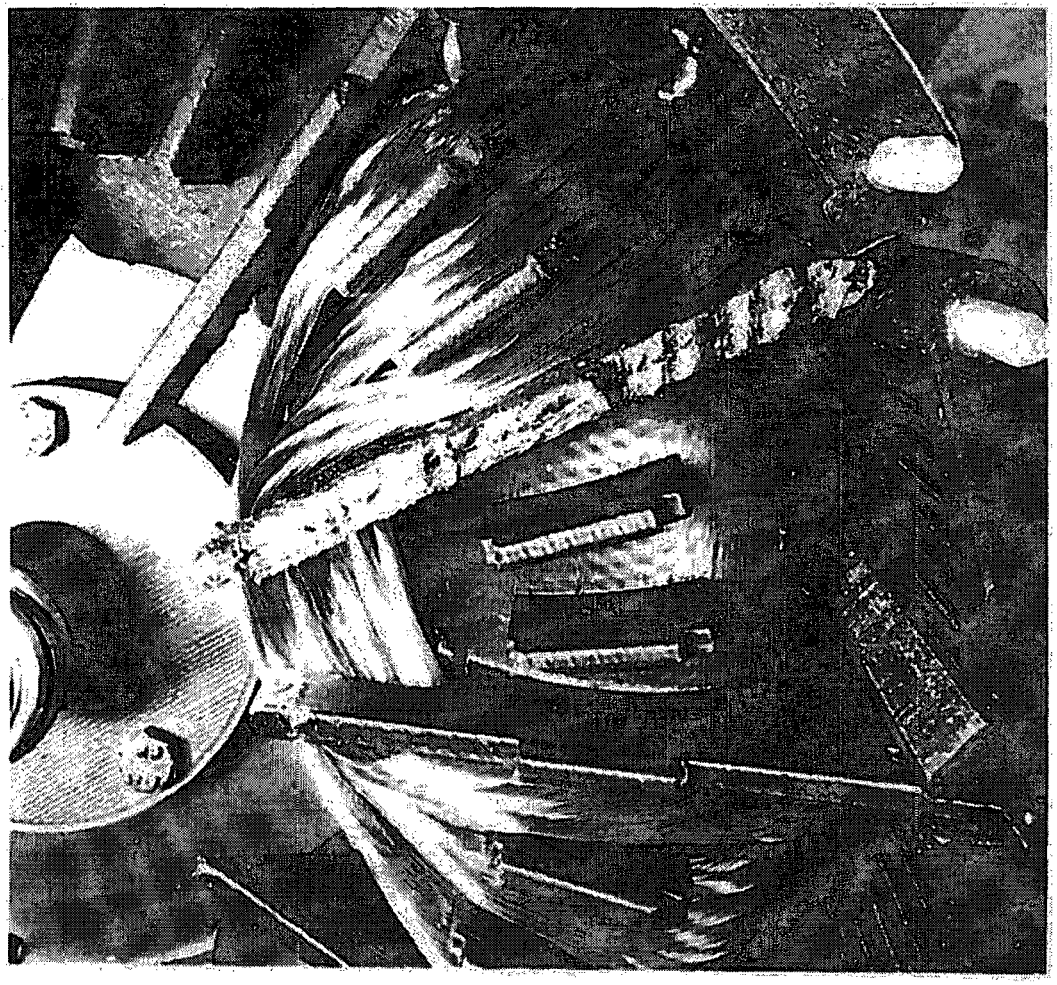
FIG. 22 is a similar view to FIG. 21 from a different angle.

In the embodiment of FIGS. 20 to 22, the magnets 565 have alternated poles, by which is meant that the flux does not flow from one to the next, but at one inter magnet gap 5651 two N poles are provided and at the next gap 5652, two S poles are provided. This NS SN arrangement is continued around the rotor and causes a greater flux density flowing out of the N-N gap and a correspondingly greater flux density flowing back in at the next, i.e. S-S, gap, than is the case with aligned magnets. The curved winding portions therefore experience a greater force and the torque of the motor is greater. Further the radial flux direction does not change as the winding moves past the gaps and timing of current reversal is more forgiving. It should be noted with reference to FIG. 19 that there is flux radiating through the length of the gap between each magnet. That is not to say that the flux density is uniform, rather that there is a reasonably even flux to be experienced by a current carrying winding wire as it travels past the gap.

The circumferential pitch of the magnets 565 at which the flux reverses is doubled and thus the circumferential pitch at which the windings reverse is also doubled. Winding to achieve this will now be described. The formers 515 are essentially doubled up ones of the formers 415. They have end flanges 552,553 and three central flanges 5541,5542, 5543. Between them there are eight spacers 5561,5562, 5563,5564,5565,5566,5567,5568. The actual windings are similar to those on the former 415, so will not be described in full detail. Also there are two alternatives.

The first alternative is for the case where the magnets are thin with respect to the distance between adjacent central flanges, i.e. of the order of half or less. In this non-illustrated case;
i. A first phase 1 winding (511) is from between the end flange 552 and the spacer 5561 to between the flange 5542 and the spacer 5565;
ii. A first phase 2 winding (512) is from between the spacer 5561 & the spacer 5562 to between the spacer 5563 & the spacer 5566;
iii. A first phase 3 winding (513) is from between the spacer 5562 & the flange 5541 to between the spacer 5566 and the flange 5543;
iv. A second phase 1 winding (521) is from between the flange 5541 and the spacer 5563 to between the flange 5543 and the spacer 5567;
v. A second phase 2 winding (522) is from between the spacer 5563 & the spacer 5564 to between the spacer 5567 & the spacer 5568;
vi. A second phase 3 winding (523) is from between the spacer 5564 & the flange 5542 to between the spacer 5568 and the flange 553.

The corresponding first and second windings of the individual phases are approached at the same time by magnet poles of opposite polarity. Accordingly, if the two windings of any one phase are wired in parallel, they must be wound in opposite direction to attract the two magnets, which are arranged with the poles opposed as NS SN etc. If the windings are in series, one can be wound in the opposite direction or the current can be passed in the opposite direction through the windings to achieve the same effect. In this alternative, whichever way the windings are connected as just described, with the thin magnet, the polarity of the winding approached by a magnet and that of the winding that has been passed must be opposite which is achieved by switching the phases' polarity as described for the previous embodiment.

In the alternative of the magnets being thick, i.e. of the order of the distance between the central flanges, a magnet will not experience induced flux at both ends from any one triplet of parts of the windings. There is no need therefore for instance for the winding part between the end flange 552 & the spacer 5561 and the part between the spacer 5562 & the flange 5541 to develop opposite polarity flux when the magnet is centred with respect to these flanges. Therefore the windings 511,512,513 can be driven in phase. This is conveniently achieved by arranging them in parallel or in series with each other.

In this alternative, the windings 521,522,523 are also similarly arranged. However, they are driven out of phase with the other windings. In this way as a magnet passes through the formers 515, it is attracted into the winding parts in front and repelled from those behind as follows:

1. Firstly it is attracted by the winding parts between flanges 552 & 5541,
2. Next it is attracted by the winding parts between the flanges 5541 & 5542 and with a phase change in the current in the winding parts of 1—following a brief zero current interval—repelled by these winding parts,
3. As it approaches the winding parts between flanges 5542 & 5543 it is again attracted by the flux of these parts, whose current direction has just changed and taking account of their opposite direction of wind. It is then also repelled by the just-passed winding parts between the flanges 5541 & 5542, with a phase change in these winding parts;
4. Finally it is likewise pulled into the windings between flanges 5543 & 553 and repelled from between the 5542 & 5543.

The process continues with this magnet in the next former and the next magnet in this former. It should also be noted that when the magnet just described is in first half of the double former there is in fact a magnet in front of it in the other half of this double former. It is of opposite polarity and experiences opposite phase flux, which can be understood by remembering that the magnets are set at a pitch equal to that of oppositely wound parts of the same windings.

The invention is not intended to be restricted to the details of the above described embodiments. For instance, the magnets can be of other cross-sectional shape with a corresponding other shape of the toroidal void and formers. The magnets can also be hollow to reduce weight and indeed concentrate their magnetic field close to the magnetic field of the winding parts. The number of magnets used, typically between six and a dozen, can be chosen in accordance with the size and torque requirement of the motor concerned. The number of phases, one, two, three, or more, can also be chosen on the same basis.

Self-starting of the motor can be better assured if one set of the winding parts is slightly out of phase with the others. Thus if the magnets are all but one aligned with their middles at the shaped winding portions, the out of phase winding parts will exert a torque on the rotor to start it moving.

An alternative self-starting facility can be provided by provision of an additional winding, and sensors and drive circuit, around the part or the entirety of the stator out of phase with the first winding. The two windings then act out of phase on the magnets. This effect can be created by rotating the two formers 115,116 out of phase with each other.

In this context, it can be mentioned that the winding of the first embodiment is a single run of a single wire. It can be augmented by a further or many further wires following the same path. A single drive circuit could be employed to energise the two windings with one on at at time, i.e. with the on one being on whilst the other is off as described above in respect of the transistor switch state (1). The energisation need not be alternate, but could overlap.

Other types of sensors can be used in place of the Hall effect sensors, including optical sensor and indeed back emf sensors.

Further the motor can be driven synchronously by applying an alternating current to the winding. The alternating current can be of conventional wave shape or for instance a square wave shape, with or without zero current intervals between the positive and negative pulses.

Whist the above embodiment has the magnets inside the winding, it is possible with hollow magnets to arrange them with the winding inside them. In this arrangement, the magnets are arranged on the rotor disc with each having a lengthways slot aligned with the central plane of the disc and open outwards. The winding is arranged on a toric former inside the toric void of the magnets, remembering that the magnets are separated by gaps, in other words their toric void is intermittent. In a further variant, the magnets are arranged to extend from the disc with their slots to one side of the disc, with a shepherd's crook or question mark cross-section. The winding can then extend at each shaped part around the outside of the magnets and then around an internal toric void, noting that where the shaped part extends clockwise outside, it must extend anti-clockwise inside and vice versa.

Further, though the motor as described above has no electromagnetic cores, it is envisaged that these may be useful in the motor. However at this stage a core configuration has not been developed.

The invention claimed is:
1. An electromagnetic machine comprising:
a rotating portion having:
  a skeletal or disc rotor parallel to a plane in the machine,
  a shaft journalled in the machine for the rotor to rotate about and
  a plurality of permanent magnets carried by the rotor, the magnets being:
    arranged in sequence in the same or alternatingly opposed orientation with a pitch at least substantially double or a multiple of their polar length in a constant cross-section space with:
      their polar axes at least substantially in the plane and arranged tangentially to a circular path around the shaft, at least substantially equal spacing around the path, and with their transverse cross-section defining a surface of revolution and a stationary portion having:
a single former or a compound former of plastics material having:
a constant cross-sectional shape following around the path and complementary to and outside of the surface of revolution for winding onto and,
lips or flanges for winding about at an inner region of the former, the lips or flanges being provided at a pitch substantially equal to the polar length in the case of the magnets oriented the same way or the magnets' pitch in the case of alternating magnet orientation respectively,
a winding on the former with a plurality of segments connected in series, each segment comprising at least:
first and second shaped winding parts outside at least part of the former:
extending back and forth in respective opposite directions around a radially outer region of the former,
from one side of the plane to the other on respective cross-sections of the space,
following at least part of a cross-sectional shape of the former(s), radially of the shaft, transverse to the path followed by the magnets with little or no extent in the direction of the path and
on cross-sections spaced substantially equally to the polar length or the magnets' pitch and
intervening connecting winding parts comprising:
a first path direction part, between the first and second shaped winding parts, with an extent substantially equal to the polar length or the magnets' pitch in the direction of the circular path, and
a second path direction part between the second and first shaped winding parts, with a further extent substantially equal to the polar length or magnet pitch in the direction of the circular path respectively the arrangement being such that a magnetic field induced by a current in the winding in the shaped parts of the winding acts with oppositely directed magnetic fields in the constant cross-section space on successive poles of the magnets.

2. An electromagnetic machine as claimed in claim 1, wherein the former is a single former extending the extent of the segments.

3. An electromagnetic machine as claimed in claim 1, wherein the former is a compound former comprised of a number of short winding formers, the compound former extending the extent of the segments.

4. An electromagnetic machine as claimed in claim 1, wherein there are more magnets than segments.

5. An electromagnetic machine as claimed in claim 1, including:
means for sensing the position of the magnets relative to the winding and
means for applying current to the winding, means for applying alternating current in accordance with the sensed magnet/winding position.

6. An electromagnetic machine as claimed in claim 5, wherein
the shaped parts of the winding are divided into multiple phases in the path direction and
the current applying means is adapted to supply multi-phase current to the phases of the winding, in accordance with the position of the magnets relative to the winding.

7. An electromagnetic machine as claimed in claim 1, wherein:
the magnets are arranged in the same, NS NS NS, orientation and
the back and forth shaped parts of the winding are alternatingly arranged adjacent to each other.

8. An electromagnetic machine as claimed in claim 1, wherein:
the magnets are arranged in alternatingly opposed, NS SN NS, orientation,
the back and forth shaped parts of the winding are arranged to have current applied to them as separate phases with:
two back shaped parts adjacent to each other, followed by
two forth shaped parts adjacent to each other
and so on and
a first of the back shaped parts being connected to a first of the forth shaped elements with one of the intervening parts between them and a second of the back shaped parts being connected to a second of the forth shaped elements with one of the intervening parts between them
the arrangement providing two phases, which can each be subdivided into three phases or be connected without subdivision.

9. An electromagnetic machine as claimed in claim 1, wherein the intervening connecting parts are continuously curved in a plane at least substantially orthogonal to that of the shaped parts.

10. An electromagnetic machine as claimed in claim 1, wherein the winding has multiple loops, with each loop having an opposite, return, intervening-connecting part connecting the end of one back shaped part to the beginning of the next forth shaped part.

11. An electromagnetic machine as claimed in claim 1, wherein the electromagnetic machine is a motor.

12. An electromagnetic machine as claimed in claim 1, wherein the electromagnetic machine is a generator.

13. An electromagnetic machine as claimed in claim 1, wherein the constant cross-section space is toroidal.

14. An electromagnetic machine as claimed in claim 1, wherein the magnets are arranged with their polar axes on a central plane of the rotor.

15. An electromagnetic machine as claimed in claim 1, wherein the magnets are arranged with their polar axes to one side of a central plane of the rotor.

16. An electromagnetic machine as claimed in claim 15, wherein the first and second magnets and/or their windings are angularly offset to provide even torque generation.

17. An electromagnetic machine as claimed in claim 1, wherein a toroidal space is provided in between two formers assembled on either side of the rotor before winding the winding.

18. An electromagnetic machine as claimed in claim 17, wherein the winding is wound around the greater part of the cross-section of the toroid and encapsulates the rotor.

19. An electromagnetic machine as claimed in claim 18, wherein the formers are arranged for the winding to extend over less than half the cross-section and two such complementary formers and windings are assembled to opposite sides of the rotor.

20. An electromagnetic machine as claimed in claim 1, wherein magnets are of circular cross-section and the toroidal cross-section is complementarily shaped, and wherein the magnets and their polar axes are curved complementarily to the curvature of the toroid.

21. An electromagnetic machine as claimed in claim 1, wherein the magnets are solid with their polar axes passing through their bodies.

22. An electromagnetic machine as claimed in claim 1, wherein inter-magnet spaces are to be filled.

23. An electromagnetic machine as claimed in claim 1, in combination with a positive and negative going square wave generator, having a conventional alternating current wave shape or a square wave shape, with or without zero current intervals between the positive and negative pulses.

* * * * *